May 30, 1967  D. GILLELAND, JR  3,321,837

INSTRUMENT FOR MEASURING IRREGULAR OBJECTS

Filed Oct. 14, 1965

INVENTOR
DEWEY GILLELAND, JR.
BY Beale and Jones
ATTORNEYS

United States Patent Office 3,321,837
Patented May 30, 1967

3,321,837
INSTRUMENT FOR MEASURING IRREGULAR OBJECTS
Dewey Gilleland, Jr., 4633 Pinewood Ave., Jacksonville, Fla. 32207
Filed Oct. 14, 1965, Ser. No. 496,017
2 Claims. (Cl. 33—148)

This invention relates to an instrument of the type used by jewelers and appraisers to measure the dimensions and proportions of diamonds and other gem stones. These measurements are particularly useful in estimating the weight of gem stones, especially when such stones are already mounted in a piece of jewelry and actual weight cannot be determined.

The dimensions and proportions of gem stones are very necessary in determining if the stone has been cut to proportions recognized in the industry as ideal; that is, that yield a stone of maximum value. Gem cutters often vary the proportions used in order to obtain a greater weight yield from a given piece of rough material. However, any deviation from the recognized ideal proportions results in a reduction in brilliancy, and, even though a stone of greater weight is produced, the value of the finished stone is less than that of a stone cut to the ideal proportions. Heretofore, it has been necessary for jewelers to estimate the amount of deviation from these ideal proportions by making visual observations without the aid of measuring instruments. Such estimates are subject to considerable error, and, as a result, the valuation of a given stone's worth is likewise subject to great variation. Thus a need has existed, and still exists, for an instrument which will make possible the accurate measurement of the dimensions and proportions of both mounted and unmounted gem stones.

It is, therefore, the general object of this invention to provide an instrument that will make possible the accurate measurement of the dimensions and proportions of gem stones and thereby give jewelers and appraisers a reliable basis from which to estimate the value of a given stone.

Another object of the invention is to provide an instrument that will make possible the measurement of distances to points intermediate to the ends of a body even though the intermediate diameter of the body is not constant.

A further object of the invention is to provide an instrument that will make possible the measurment not only of the total length of a body but also the distance between intermediate points, or between an intermediate point and end points of said body, when the respective diameters of the body at the points of interest are not the same.

The construction and operation of the invention may be more completely understood by referring to the specification and drawing wherein.

Figure 1:
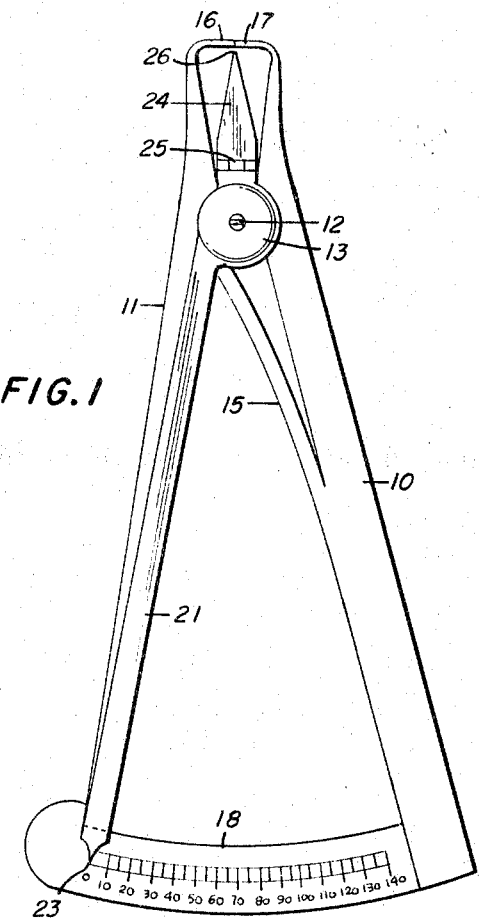
FIG. 1 is an elevation of the instrument showing one form of the invention.

Referring to the drawings, it will be seen that the instrument incorporates two arms 10 and 11, which are pivotally connected at a point intermediate of their ends by a screw 12. The screw 12 passes through plate 13 and is secured by threads in plate 14 on the opposite side of the arms 10 and 11. A spring 15 extends from arm 10 and bears at its free end against the arm 11, thus tending to force the body engaging members 16 and 17 toward the closed position shown in FIG. 1. Rigidly affixed to arm 10 is an arcuate graduated scale 18 across which the indicating member 19 of arm 11 moves. The distance traversed by indicating member 19 across the graduated scale 18 is proportional to the linear distance between body engaging members 16 and 17 or, in other words, to the length of the body held between said body engaging members.

A third arm 21 is provided for the purpose of measuring the distances from body engaging member 17 to points of interest intermediate to the ends of the body being measured. The arm 21 is pivoted at screw 12 and has an indicating member 23 similar to that of arm 11, said indicating member 23 also traversing scale 18. The end of arm 21 opposite the indicating member 23 is provided with a pointer member 24. Number 26 indicates the tip of this pointer member. Pointer member 24 is connected to arm 21 by means of rotary connection 25. The construction of the rotary connection 25 is such that its axis of rotation is both contained in a plane parallel to the plane containing arm 21 and perpendicular to a plane containing the center-line of pivotal screw 12 and the tip 26 of pointer member 24.

Figure 4:
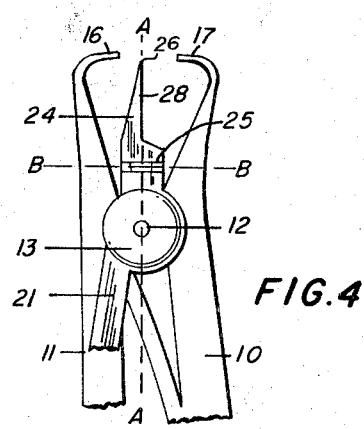
FIG. 4 is a partial elevation of the instrument showing a modified form of the invention.

Reference to FIG. 4 will more clearly illustrate this construction. As can be seen, in FIG. 4, the axis of rotation of rotary connection 25, represented by line B—B, and the line joining the tip 26 of pointer member 24 with the centerline of pivotal screw 12, represented by line A—A, are always mutually perpendicular, irrespective of the position of pointer member 24 with respect to body engaging member 17. Thus, regardless of the degree of angular rotation of pointer member 24, the tip 26 of said pointer member will always remain in proper linear relationship to the indicating member 23 of arm 21. Accordingly, the length of travel of indicating member 23 across scale 18 will accurately represent the distance between the tip 26 and body engaging member 17, said distance being measured along a line between body engaging members 16 and 17. The hinge member 24 on member 21 will permit the tip 26 to be brought adjacent a point to be used on the object being measured, especially when the object is irregular in shape.

FIG. 4 shows a modified form of the invention wherein the pointer member 24 is provided with a straight alignment edge 28. As shown in FIG. 4, the edge 28 is coincident with the line A—A joining the centerline of the pivotal screw 12 with the tip 26 of the pointer member 24. Therefore, any point along the edge 28 can be used to accurately measure a point on the surface of a body held between the body engaging members 16 and 17. It is readily apparent that this modified form of the invention makes possible the measurement of bodies of diameters sufficiently large that the tip 26 of pointer member 24 will not come into contact with the surface of the body.

Figure 2:
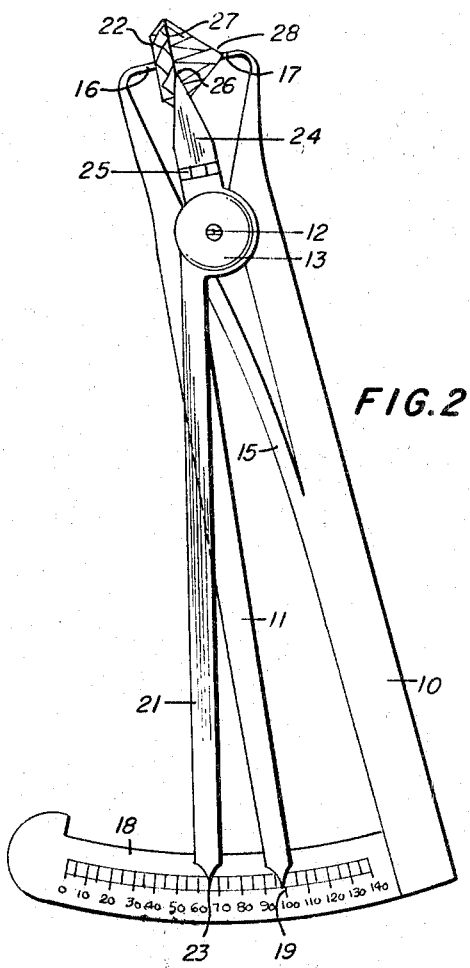
FIG. 2 is an elevation of the instrument showing a diamond in position between the body engaging members.
Figure 3:
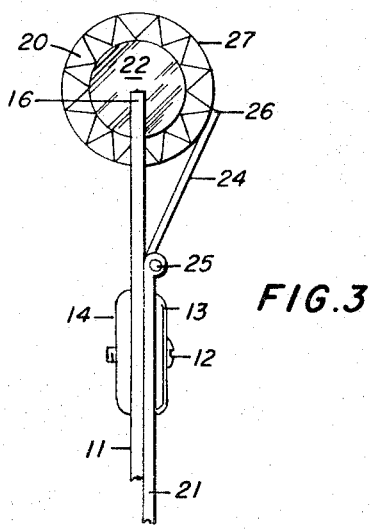
FIG. 3 is a longitudinal section as indicated by line 3—3 of FIG. 2 showing the invention in use.

In using the invention, a diamond, such as shown at 20, may be positioned between the body engaging members 16 and 17. The overall length of the diamond, that is, the depth from table 22 to cutlet 28, may be read from the scale 18 by reference to the position of indicating member 19 of arm 11. To obtain pavilion depth, the distance from cutlet 28 to girdle 27, the tip 26 of the pointer member 24 may be aligned with the edge of the girdle 27, as is shown in FIG. 2. The pavilion depth may then be read from scale 18 by reference to the position of indicating member 23 of arm 21. In aligning the tip 26 of pointer member 24 with the girdle 27, the pointer member 24 may be rotated in a plane normal to that containing the arm 21. By this movement, the tip 26 of the pointer member 24 may be brought into exact alignment with the edge of the girdle 27, making possible the accurate measurement of pavilion depth. In a like manner, the distances to other points of interest on the diamond may be determined. To locate each point, the pointer member 24 may be rotated so that the tip 26 touches the surface of the diamond precisely at the point of interest.

While the embodiments illustrated refer to the measurement of diamonds, it will be understood that the invention can be adapted for use in other industries where measurements to points on the surfaces of bodies of differing diameters are desired. Therefore, this invention is not intended to be limited to the embodiments disclosed herein, but applies to anything incompassed within the following claims.

I claim:

1. In a measuring instrument consisting of: two arms pivoted about an axis intermediate their ends, said arms having opposed body engaging members at one end; a transverse graduated scale on the opposite end of one arm; an indicating member on the opposite end of the other arm to traverse said scale; a third arm pivoted about said axis, said third arm having at one end an indicating member movable across the scale of said first arm; the combination of a pointer member rotatably connected to said third arm and having a tip end so that the tip of said pointer member can be rotated in a plane containing the pivot point of said third arm, and wherein said plane is normal to the plane containing said third arm.

2. A measuring instrument according to claim 1 wherein said pointer member includes a reference edge portion extending along a line from the tip of the pointer member to said pivot point of said arm.

References Cited
UNITED STATES PATENTS

| | | | |
|---|---|---|---|
| 608,183 | 8/1898 | Davis | 33—148 |
| 1,681,121 | 8/1928 | Larsen | 33—148 |
| 1,751,833 | 3/1930 | Millar | 33—148 |
| 1,972,655 | 9/1934 | Hillye | 33—149 |

LEONARD FORMAN, *Primary Examiner.*

W. D. MARTIN, *Assistant Examiner.*